United States Patent
Kojima

(10) Patent No.: US 6,625,442 B1
(45) Date of Patent: Sep. 23, 2003

(54) MOBILE COMMUNICATION SYSTEM HAVING SERVICE SUB-AREAS INDEPENDENTLY ASSIGNED SPECIAL SERVICES

(75) Inventor: Jun-Ichiroh Kojima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/354,342

(22) Filed: Jul. 16, 1999

(30) Foreign Application Priority Data

Jul. 31, 1998 (JP) .......................................... 10-217503

(51) Int. Cl.$^7$ .............................................. H04M 3/42
(52) U.S. Cl. ........................................ 455/414; 455/456
(58) Field of Search ................................ 455/422, 465, 455/462, 13.1, 499, 414, 443, 444, 446, 448, 449, 11.1, 445, 453, 406, 67.1, 435, 456

(56) References Cited

U.S. PATENT DOCUMENTS

| | | | | | |
|---|---|---|---|---|---|
| 5,594,782 A | * | 1/1997 | Zicker et al. | ................ | 455/417 |
| 5,640,677 A | * | 6/1997 | Karlsson | ...................... | 455/434 |
| 5,797,093 A | * | 8/1998 | Houde | ......................... | 455/445 |
| 5,870,392 A | * | 2/1999 | Ann | ........................... | 370/335 |
| 5,924,036 A | * | 7/1999 | Gustafson | .................... | 455/447 |
| 5,983,107 A | * | 11/1999 | Hayashi et al. | .............. | 455/446 |
| 6,026,277 A | * | 2/2000 | Gavrilovich | ................ | 455/11.1 |
| 6,088,598 A | * | 7/2000 | Marsolais | .................... | 455/566 |
| 6,108,535 A | * | 8/2000 | Moriya | ........................ | 455/11.1 |
| 6,108,563 A | * | 8/2000 | Shishino | ...................... | 455/560 |
| 6,285,883 B1 | * | 9/2001 | Bringby | ....................... | 455/437 |
| 6,334,052 B1 | * | 12/2001 | Nordstrand | ................. | 455/435 |
| 6,397,040 B1 | * | 5/2002 | Titmuss et al. | ............. | 455/414 |

FOREIGN PATENT DOCUMENTS

| | | | | | |
|---|---|---|---|---|---|
| JP | 04074094 | * | 3/1992 | ............ | H04Q/7/04 |
| JP | 0076192 | * | 3/1996 | ............ | H04Q/7/30 |
| JP | 09275588 A | * | 10/1997 | ............ | H04Q/7/38 |
| JP | 10327474 | * | 12/1998 | ............ | H04Q/7/38 |
| WO | WO 9955102 A1 | * | 10/1999 | ............ | H04Q/7/20 |

* cited by examiner

*Primary Examiner*—Quochien Vuong
(74) *Attorney, Agent, or Firm*—Sughrue Mion, PLLC

(57) ABSTRACT

A cellular communication system assigns service areas to base stations for a communication service between mobile stations movable over the service areas, and an exchange and control station connects the mobile stations through message channels, the base stations and communication lines to the base stations for the communication service, wherein sets of communication facilities are respectively installed in service sub-areas defined in at least one of the service areas for selectively broadcasting a piece of system information indicative of a special service such as, for example, a limit of mobile stations concurrently communicable with the associated base station in the service sub-areas, thereby economically restricting congestion to a service sub-area.

19 Claims, 2 Drawing Sheets

| 2 | ID CODE OF SERVICE SUB-AREA | SPECIAL SERVICE | A |
|---|---|---|---|
| ⋮ | ⋮ | ⋮ | ⋮ |
| ⋮ | ⋮ | ⋮ | ⋮ |

51 · 52 · 53 · 54 · }55

| 2 | DISCRIMINATIVE CODE | KIND OF SERVICE |
|---|---|---|
| ⋮ | ⋮ | ⋮ |
| ⋮ | ⋮ | ⋮ |

56 · 57 · 58 · }59

MOBILE COMMUNICATION SYSTEM HAVING SERVICE SUB-AREAS INDEPENDENTLY ASSIGNED SPECIAL SERVICES

FIELD OF THE INVENTION

This invention relates to a mobile communication system and, more particularly, to a cellular communication system for providing communication with mobile stations.

DESCRIPTION OF THE RELATED ART

A cellular communication system is popular in the mobile communication. The cellular communication network is shared between many subscribers. However, the subscribers are usually getting more and more. For this reason, a district covered with the cellular communication network is divided into wide service areas at the initial stage of the business, and the wide service area is further divided into narrow service areas together with the development of the business. Thus, the subscribers in each service area do not exceed a certain limit, and the cellular communication network is prevented from serious congestion. Even if the serious congestion takes place in a narrow service area, the serious congestion does not affect the communication in the other narrow service areas, and the cellular communication system permits most of the subscribers to communicate with one another.

However, the prior art cellular communication system requires base stations in the narrow service areas, respectively, and the base stations independently behave in the individual narrow service areas. This means that the prior art cellular communication network can not interchange the communication channels between the congestion area and the non-congestion area. This is the first problem inherent in the prior art cellular communication network.

Another problem is high construction cost. When the subscribers in a service area exceeds the limit, the service area is divided into plural narrow areas, and a new base stations is to be constructed in the narrow area. Even though other service areas do not exceed the limit, the new base station is required for the narrow area. The new base station is expensive, and pushes up the construction cost of the prior art cellular communication network.

Yet another problem relates to the division of a service area into narrow areas. The new base stations are to be located at appropriate places in the associated narrow service areas from the viewpoint of propagation of electromagnetic waves. However, the most appropriate place is not always vacant. This means a difficult negotiation with the owner. Thus, the third problem is the difficulty in the favorable location of the new base station.

SUMMARY OF THE INVENTION

It is therefore an important object of the present invention to provide a cellular communication system, which is flexible and low in construction cost without influence of local congestion.

In accordance with one aspect of the present invention, there is provided a cellular communication system for a real space divided into plural service areas, at least one of the plural service areas contains a first service sub-area, and the cellular communication system comprises plural base stations respectively installed in the plural service areas and creating communication channels in the associated service areas, respectively, plural mobile stations each movable in the real space and selectively communicating with the plural base stations through the communication channels, an exchange and control station connected to the plural base stations through communication lines, connecting at least the mobile stations through the communication channels, the plural base stations and the communication lines to one another and supplying a piece of system information indicative of a special service requested in the first service sub-area and different from a standard communication service between at least the mobile stations to the base station in the aforesaid at least one of the plural service areas and a set of communication facilities installed in the first service sub-area and creating an information channel to the mobile stations in the first service sub-area for transferring the piece of system information, thereby realizing the special service in the first service sub-area.

BRIEF DESCRIPTION OF THE DRAWINGS

The features and advantages of the cellular communication network will be more clearly understood from the following description taken in conjunction with the accompanying drawings in which.

DESCRIPTION OF THE PREFERRED EMBODIMENT

Figure 1:
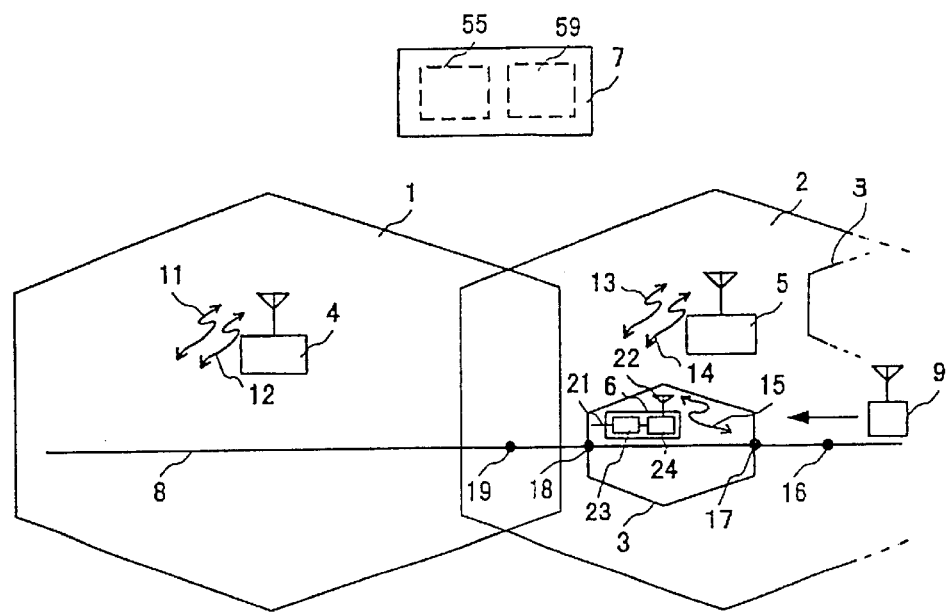
FIG. 1 is a schematic view showing a cellular communication network according to the present invention.

Referring to FIG. 1 of the drawings, adjacent service areas are respectively designated by reference numerals 1 and 2. Although more than two service areas are arranged like a honeycomb, only two service areas 1 and 2 are shown in FIG. 1. These service areas are covered with a cellular communication system embodying the present invention. Identification codes are respectively assigned to the service areas 1 and 2, and are assumed to be identical with the reference numerals, i.e., "1" and "2". Plural service sub-areas 3 are defined in the service area 2. The service sub-areas 3 are much narrower than the service area 2. Although service sub-areas are also defined in another service area, they are not shown in FIG. 1 for the sake of simplicity. A service sub-area 3 may be the inside of a theater or a hall.

The cellular communication system includes base stations 4 and 5, other base stations (not shown) respectively associated with the other service areas, plural sets of communication facilities 6 respectively installed in the service sub-area 3 and an exchange and control station 7. The base stations 4 and 5 communicate with mobile stations in the service areas 1 and 2, respectively. The exchange and control station 7 is connected to the base stations 4 and 5 through communication lines (not shown), and manages the communication between the mobile stations and/ or between the mobile stations and other communication terminals. The mobile stations in the service area 1 communicate with the associated base station 4 through a control channel 11 and message channels 12 such as speech channels, and the mobile stations in the service area 2 communicate with the associated base station 5 through a control channel 13 and the message channels 14 or speech channels. Only one mobile station is labeled with "9", and the mobile station 9 has an internal memory (not shown). Although the mobile station 9 is presently in the service area 2, the mobile station 9 is going to move through the service sub-area 3 into the service area 1 along line 8.

Figure 2:
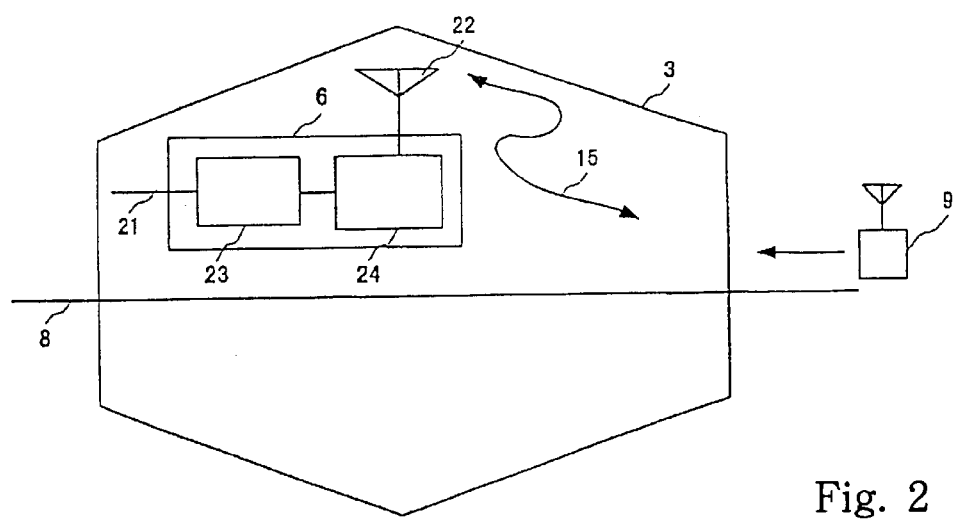
FIG. 2 is a schematic view showing a service sub-area and equipment installed therein.

As described hereinbefore, a set of communication facilities 6 is installed in each of the service sub-areas 3. However, only the communication facilities 6 in the service sub-area 3 intersected with the line 8 is hereinbelow described in detail. The set of communication facilities 6 has an antenna 22, a communication control unit 23 and a transmitter 24 as shown in FIG. 2.

An identification code is assigned to the communication control unit 23, and is indicative of the service sub-area 3. In other words, the identification code is assigned to the service sub-area 3, and is stored in the communication control unit 23. The communication control unit 23 is connected through a communication line 21 to the base station 5.

The transmitter 24 broadcasts a piece of area information indicative of the associated service sub-area 3 through an information channel 15. When a mobile station enters the service sub-area 3, the received electric power at the mobile station exceeds a reference level, and the mobile station acknowledges the entry into the service sub-area 3.

Figures 3, 4, 5:
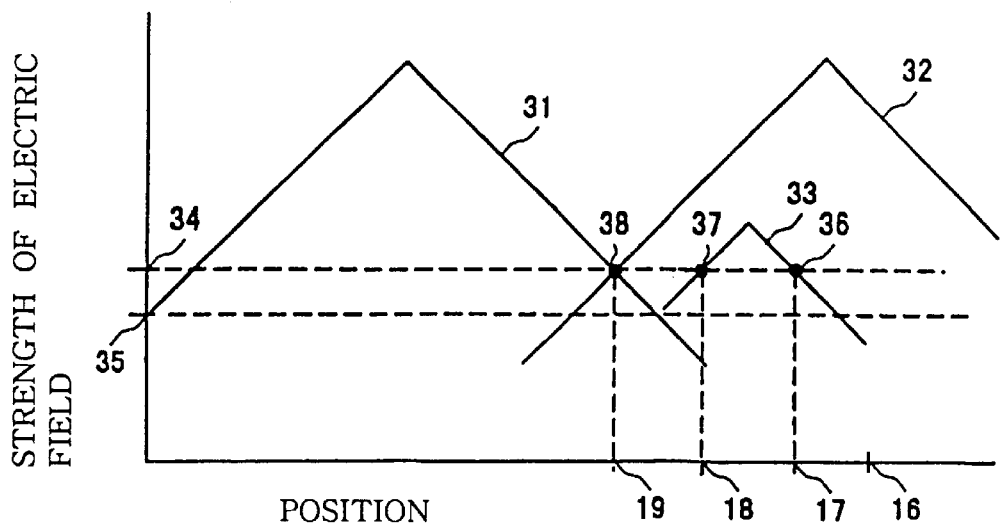
FIG. 3 is a view showing an information table stored in a memory unit incorporated in an exchange and control unit.
FIG. 4 is a view showing another information table storage in another memory unit incorporated in the exchange and control unit.
FIG. 5 is a graph showing the strength of electric field along a line passing through one of the service areas.

The exchange and control station 7 has memory units 55 and 59. An information table is stored in the memory unit 55, and defines relation between the service area 1/ 2 . . . , the service sub-areas 3, special services permitted or limited in the service areas 3 and virtual service areas to be assigned to the service sub-areas 3 as shown in FIG. 3. Data storage areas are arranged in rows and columns in the information table. Control data information for one of the service sub-areas 3 occupies a single row of the data storage areas.

Four columns 51, 52, 53 and 54 are incorporated in the information table defined in the memory unit 55. The column 51 is assigned to first pieces of control data information indicative of the identification codes of the service areas 1/ 2/ . . . . The column 52 is assigned to second pieces of control data information indicative of the identification codes of the service sub-areas 3 defined in the service area. Third pieces of control data information are indicative of the special services already permitted or limited in the service sub-areas, and are stored in the third column 53. One of the special services to be permitted is prohibition from calling and responding to an incoming call. Another special service relates to a limit on the number of mobile stations concurrently communicable with the associated base station. The column 54 is assigned to fourth pieces of control data information indicative of virtual service areas to be assigned to the service sub-areas 3.

Another information table is stored in the memory unit 59, and defines relation between the service areas 1/ 2/ . . . , the current positions of the mobile stations and kinds of services given to the mobile stations. Data storage areas are also arranged in rows and columns in the information table as shown in FIG. 4. Control data information for one of the mobile stations occupies a row of data storage areas. The information table is divided into three columns 56, 57 and 58. The column 56 is assigned fifth pieces of control data information indicative of the identification codes of the service areas 1/ 2/ . . . where the mobile stations are passing or the identification codes of the virtual service areas. The column 57 is assigned to sixth pieces of control data information indicative of discriminative codes of the mobile stations. The discriminative code represents a telephone number given to the subscriber or a product number of the mobile station, by way of example, and the exchange and control unit determines whether or not the mobile station has a right to communicate through the cellular communication network. The column 58 is assigned to seventh pieces of control data information indicative of kinds of services such as a standard service or the service to be specially permitted or limited. Thus, the information table in the memory unit 55 stores the control data information for each service sub-area 3, and the other information table in the memory unit 59 stores the control data information for each mobile station.

Subsequently, description is made on the communication through the cellular communication system. The description is focused on the mobile station 9 moving along the line 8. Reference numerals 16, 17, 18, 19 are representative of points on the line 8. FIG. 5 illustrates the strength of electric field varied along the line 8. Plots 31, 32 and 33 are representative of the strength of electric field in the service area 1, the strength of electric field in the service area 2 and the strength of electric field in the service sub-area 3 intersected with the line 8.

Behavior at Point 16

The mobile station 9 is assumed to capture the control channel 13 at point 16. Then, the mobile station 9 starts a registration of the current position by transmitting a first piece of private data information containing the discriminative code thereof and a kind of current service to the base station 5. The kind of current service is assumed to indicate the standard service, i.e., a communication through the message channel 14. The base station 5 transfers the first piece of private data information to the exchange and control station 7 through the communication line.

When the exchange and control station 7 receives the first piece of private data information, the exchange and control unit 7 acknowledges that the mobile station 9 is in the service area 2, because the base station 5 transmitted the first piece of private data information to the exchange and control station 7. The exchange and control station 7 determines the fifth piece of control data information to be "2". Then, the exchange and control station assigns one of the rows of the data storage areas in the information table in the memory unit 59 to the mobile station 9, and writes the fifth piece of control data information, the sixth piece of control data information representative of the service sub-area 3 and the seventh piece of control data information representative of the kind of service into the row of data storage areas.

Behavior at Point 17

The mobile station 9 reaches the point 17. The point 17 is on the boundary of the service sub-area 3. The received electric power of the information channel 15 exceeds the reference level 34 (see FIG. 5) on the boundary, and the mobile station 9 recognizes the entry into the service sub-area 3.

The exchange and control station 7 has already transfer the third piece of control data information through the base station 5 and the communication line 21 to the communication control unit 23. The third piece of control data information is indicative of the special service permitted or limited in the service sub-area 3. The communication control unit 23 supplies the third piece of control data information and the identification code indicative of the service sub-area 3 to the transmitter 24, and the transmitter 24 broadcasts a piece of system information from the antenna 22 through the information channel 15. The piece of system information contains the identification code assigned to the service sub-area 3 and the special service permitted or limited in the service sub-area.

The mobile station 9 in the service sub-area 3 captures the piece of system information broadcast through the information channel 15, and acknowledges the identification code of the service sub-area 3 and the special service permitted or limited in the service sub-area 3. The mobile station 9 stores the piece of system information in the internal memory (not shown). Then, the mobile station 9 transmits a second piece of private data information containing the identification code of the service sub-area 3, the special service permitted or limited in the service sub-area 3 and the discriminative code thereof to the base station 5 through the control channel 13.

The second piece of private data information is received by the base station 5. The base station 5 transfers the second piece of private data information to the exchange and control station 7 through the communication line. The exchange and control station 7 acknowledges that the mobile station 9 is moving in the service area 2, and determines the first piece of control data information to be "2". Then, the exchange and control station 7 accesses the information table defined in the memory unit 55, and compares the identification code of the service area 2 just determined and the contents of the second piece of private data information with the first, second, third pieces of control data information stored in the row of data storage areas assigned to the service sub-area 3.

If they are consistent with the first, second and third pieces of control data information stored in the information table, the exchange and control station 7 determines that the mobile station 9 has entered the service sub-area 3 without an interference, and instructs the mobile station 9 through the base station 5 to behave in accordance with the piece of system information.

The exchange and control station 7 further accesses the information table defined in the memory unit 55, and fetches the virtual service area code "A" assigned to the service sub-area 3 and the third piece of control data information permitted or limited in the service sub-area 3. The exchange and control station 7 rewrites the fourth piece of control data information of the mobile station 9 from "2" to "A", and makes the seventh piece of control data information consistent with the third piece of control data information.

While the mobile station 9 is moving in the service sub-area 3, it periodically checks the information channel 15 to see whether or not a new piece of area information and a new piece of system information reach. Moreover, the mobile station 9 monitors the control channel 13 to see whether or not any incoming call is addressed thereto, and waits for an incoming call. The mobile station 9 further waits for a request for a communication through the network also under the conditions given through the piece of system information. The communication between the mobile station 9 and another subscriber will be described hereinlater in detail.

If the mobile station receives a new piece of area information different from the piece of area information already received and/or a new piece of system information different from the piece of system information already received, the mobile station repeats the registration of current position, and the identification code of a new sub-area and the discriminative code are transmitted to the base station 5.

Access from Network to Mobile Station

When a subscriber requests the exchange and control station 7 to communicate with the mobile station 9, the exchange and control station 7 accesses the information table defined in the memory unit 59, and reads out the fifth piece of control data information indicative of the current service area. The mobile station 9 is now moving on the line 8 in the service sub-area 3, and the fifth piece of control data information is representative of the virtual service area code "A". The exchange and control station 7 checks the information table defined in the memory unit 55 to see what service sub-area is assigned the virtual area code "A". The exchange and control station 7 acknowledges that the mobile station 9 is moving in the service sub-area 3 defined in the service area "2". The exchange and control station 7 determines that the current service area is "2", and reads out the third piece of control data information indicative of the service to be permitted or limited.

If the third piece of control data information allows the mobile station 9 to communicate with the subscriber, the exchange and control station 7 instructs the base station 5 a paging through the control channel 13. The base station 5 is responsive to the instruction, and informs the mobile station 9 of the incoming call. When the mobile station 9 captures the incoming call, the mobile station 9 answers the base station 5 through the control channel 13, and the base station 5 transfers the answer through the communication line to the exchange and control station 7. One of the message channels 14 is assigned to the mobile station 9, and the mobile station 9 starts to communicate with the subscriber through the message channel 14 assigned thereto, the base station 5, the communication line and the exchange and control station 7.

On the other hand, if the third piece of control data information presently prohibits the mobile station 9 from communicate with the subscriber, the exchange and control station 7 does not instructs the base station 5 any paging. The exchange and control station 7 may inform the subscriber that the communication is not admittable.

Access from Mobile Station to Network

While the mobile station 9 is moving along the line 8 in the service sub-area 3, a user is assumed to request the mobile station 9 to communicate with another subscriber. If the piece of system information presently allows the mobile station to communicate with the subscriber, the mobile station 9 supplies an outgoing call through the control channel 13 to the base station 5, and the base station 5 transfers the outgoing call through the communication line to the exchange and control station 7. When the subscriber answers the call, the base station 5 assigns one of the message channels 14 to the mobile station 9, and the mobile station 9 starts to communicate with the subscriber through the base station 5 and the exchange and control station 7. On the other hand, if the piece of system information presently prohibits the mobile station 9 from the communication, the mobile station 9 informs the user of the prohibition.

Behavior at Point 18

When the mobile station 9 reaches point 18, it just exits the service sub-area 3, and the power level becomes lower than the reference level 34. Then, the mobile station 9 acknowledges itself to be in the service area 2 outside the service sub-area 3. The mobile station 9 captures the control channel 13, and carries out the registration of current position. Namely, the mobile station 9 transmits a new piece of private data information containing the discriminative code and the standard service instead of the identification code of the service sub-area and the special service permitted or limited therein through the control channel 13 to the base station 5. The base station 5 transfers the new piece of private information through the communication line to the exchange and control station 7.

The exchange and control station 9 determines the mobile station to be in the service area 2 outside the service sub-area 3, and rewrites the fifth piece of control data information from "A" to "2". The exchange and control station 7 further rewrites the seventh piece of control data information from the special service to the standard service.

Behavior at Point 19

When the mobile station 9 reaches point 19, the power level of the information channel 15 is further lowered than the reference level 34, and the control channel 11 is higher in power level than the control channel 13. Then, the mobile station 9 transmits the first piece of private data information through the control channel 11 to the base station 4, and carries out the registration of current position. The base station 4 transfers the first piece of private data information through the communication line to the exchange and control station 7. The exchange and control station 7 determines that the mobile station 9 enters into the service area 1, and rewrites the fifth piece of control data information from "2" to "1".

As will be understood from the foregoing description, the exchange and control station 7 sets a limit on the mobile station 9 in each of the service sub-areas 3 in accordance with the third piece of control data information indicative of the special service. The service sub-areas are defined in each service area 1/ 2/. . . , and the exchange and control station 7 arbitrarily gives the special services to the service sub-areas 3. If the special service relates to the limit on the mobile stations to be allowed to concurrently communicate with the associated base station, the sets of communication facilities 6 are equivalent to new base stations installed in the service sub-areas 3. In detail, plural mobile stations are assumed to transmit requests for calls to the associated base station within a short time. The exchange and control station 7 allows the mobile stations to use the message channels 14/ 12 until the limit. However, when the requests exceed the limit, the exchange and control station 7 supplies the piece of system information indicative of the prohibition through the information channel 15 to the other mobile stations. If the exchange and control station 7 admits the service area 2 not to reach the limit, the exchange and control station 7 retards the piece of system information indicative of the prohibition in the sub-area 3, and interchange part of the communication capacity or the message channels 14 between the service sub-areas 3 in the same service area 2. Thus, the message channels 14 are interchanged between the service sub-areas 3 through the piece of system information. As a result, the congestion is limited to a narrow area in the service area 1/ 2/ . . . The set of communication facilities 6 are more economical than the base station 4/ 5, and the construction cost of the cellular communication system according to the present invention is smaller than the prior art cellular communication system.

In the above-described embodiment, the control channel 11/13 and the associated message channels 12/ 14 as a whole constitute one of the communication channels.

Although a particular embodiment of the present invention has been shown and described, it will be apparent to those skilled in the art that various changes and modifications may be made without departing from the spirit and scope of the present invention.

The service sub-area 3 may be a moving space such as, for example, a bus or a streetcar. In this instance, the set of communication facilities 6 may be a mobile telephone with a predetermined code. The set of communication facilities 6 behaves as similar to the mobile station 9. When the service sub-area or the moving space reaches point 19, the set of communication facilities 6 transmits the piece of private data information through the base station 4 to the exchange and control station 7 for the registration of current position. Then, the exchange and control station writes the identification code "1" assigned to the service area 1 into the information table in the memory unit 55 as the first piece of control data information. The access from the network to the mobile station 9 and vice versa are similar to those described hereinbefore.

The communication lines may be wires or wireless.

What is claimed is:

1. A cellular communication system for a real space divided into plural service areas, at least one of said plural service areas containing a first service sub-area, comprising:

plural base stations respectively installed in said plural service areas, and creating communication channels in the associated service areas;

plural mobile stations each movable in said real space and selectively communicating with said plural base stations through said communication channels;

an exchange and control station connected to said plural base stations through communication lines;

said exchange and control station connecting at least said mobile stations through said communication channels, connecting said plural base stations and said communication lines to one another, and supplying a piece of system information stored in a memory at said exchange and control station and indicative of a special service in said first service sub-area and different from a standard communication service between at least said mobile stations to the base station in said at least one of said plural service areas; and a set of communication facilities installed in said first service sub-area and creating an information channel to the mobile stations in said first service sub-area for transferring said piece of system information, thereby realizing said special service in said first service sub-area.

2. The cellular communication network as set forth in claim 1, whereinsaid set of communication facilities supplies a piece of area information within said first service sub-area so that said mobile stations acknowledge themselves to be in said first service sub-area through said piece of area information.

3. The cellular communication network as set forth in claim 2, wherein said set of communication facilities broadcasts said piece of system information and said piece of area information.

4. The cellular communication network as set forth in claim 3, wherein said set of communication facilities regulates a strength of electric power on the boundary of the first service sub-area to a level detectable by said mobile stations, and said mobile stations acknowledge themselves to be in said first service sub-area when said level is detected by said mobile stations.

5. The cellular communication network as set forth in claim 3, wherein said special service to be realized in said first service sub-area is the maximum number of mobile stations allowed to concurrently communicate with said base station in said at least one of said plural service areas.

6. A cellular communication system for a real space divided into plural service areas, at least one of said plural service areas containing a first service sub-area, comprising:

plural base stations respectively installed in said plural service areas, and creating communication channels in the associated service areas;

plural mobile stations each movable in said real space and selectively communicating with said plural base stations through said communication channels;

an exchange and control station connected to said plural base stations through communication lines;

said exchange and control station connecting at least said mobile stations through said communication channels, connecting said plural base stations and said communication lines to one another, and supplying a piece of system information indicative of a special service requested in said first service sub-area and different from a standard communication service between at least said mobile stations to the base station in said at least one of said plural service areas; and a set of communication facilities installed in said first service sub-area and creating an information channel to the mobile stations in said first service sub-area for transferring said piece of system information, thereby realizing said special service in said first service sub-area, wherein said exchange and control station further comprises:

a first information table defining a relation between a first piece of control data information indicative of a first identification code assigned to said at least one of said plural service areas, a second piece of control data information indicative of a second identification code assigned to said first sub-area, a third piece of control data information indicative of said special service, and a fourth piece of control data information indicative of a virtual service area code assigned to said first service sub-area; and a second information table defining a relation between fifth pieces of control data information each indicative of one of said first identification code and said virtual service area code in which one of said mobile stations exists, sixth pieces of control data information each indicative of a third identification code assigned to said one of said mobile stations, and seventh pieces of control data information each indicative of one of said special service and said standard communication service to be requested.

7. The cellular communication system as set forth in claim 6, wherein each of said mobile stations supplies to one of the base stations a first piece of private data information when said each of said mobile stations enters said associated one of said plural service areas;

said first piece of private data information containing said third identification code assigned thereto and one of said special service and said standard communication service; and said exchange and control station determines the fifth piece of control data information indicative of said associated one of said plural service areas so as to write in said second information table for said each of said mobile stations said fifth piece of control data information, the sixth piece of control data information indicative of said each of said mobile stations, and the seventh piece of control data information indicative of said one of said special service and said standard communication service.

8. The cellular communication system as set forth in claim 7, wherein said set of communication facilities further supplies to the mobile stations in said first service sub-area a piece of area information indicative of said first service sub-area;

said each of said mobile stations, upon capture of said piece of area information, supplies through the communication channel, said base station, and said communication line to said exchange and control station a second piece of private data information containing said second identification code, said third identification code, and said special service so that said exchange and control station checks said first information table to see whether or not said special service represented by said second piece of private data information is consistent with said special service stored as said third piece of control data information.

9. The cellular communication system as set forth in claim 8, wherein said exchange and control station supplies another piece of system information indicative of the confirmation of said special service through said communication line, said base station, said set of communication facilities, and said information channel to said each of said mobile stations.

10. The cellular communication system as set forth in claim 8, wherein said special service represented by said third piece of control data information is the maximum number of requests for a communication acceptable by said base station in said at least one of said plural service areas.

11. The cellular communication system as set forth in claim 10, wherein said exchange and control station is able to change said maximum number.

12. The cellular communication system as set forth in claim 11, wherein said exchange and control station supplies another piece of system information indicative of the confirmation of said special service through said communication line, said base station, said set of communication facilities, and said information channel to said each of said mobile stations; and said each of said mobile stations operates under the conditions represented by said another piece of system information.

13. The cellular communication system as set forth in claim 12, wherein said at least one of said plural service areas further contains a second service sub-area different from said first service sub-area, and said exchange and control station reduces said maximum number of requests for increasing the maximum number of mobile stations in said second service sub-area concurrently communicating with said base station when a congestion takes place in said second service sub-area.

14. The cellular communication system as set forth in claim 13, wherein said first service sub-area is stationary with respect to said real space.

15. The cellular communication system as set forth in claim 14, wherein said first service sub-area is inside of a building.

16. The cellular communication system as set forth in claim 13, wherein said first service sub-area is movable in said real space.

17. The cellular communication system as set forth in claim 16, wherein said first service sub-area is inside of a traveling means of a public transportation system.

18. The cellular communication system as set forth in claim 8, wherein said exchange and control station checks said first information table to see what virtual service area code is assigned to said first service sub-area when said second piece of private data information is received, and rewrites associated one of said fifth pieces of control data information to said virtual service area code.

19. The cellular communication system as set forth in claim 18, wherein each of said mobile stations in said first service sub-area is accessible to associated one of said seventh pieces of control data information indicative of said special service through the communication channel, the base station and the communication line.

* * * * *

UNITED STATES PATENT AND TRADEMARK OFFICE
CERTIFICATE OF CORRECTION

PATENT NO. : 6,625,442 B1
DATED : September 23, 2003
INVENTOR(S) : Jun-Ichiroh Kojima It is certified that error appears in the above-identified patent and that said Letters Patent is hereby corrected as shown below:

Column 1,
Line 20, delete "together with the development of the business" insert -- as the customer base grows --
Lines 48 and 49, delete "place is not always vacant." insert -- location for the new base stations is not always vacant, requiring difficult negotiations with the landowner. --
Line 31, delete "independently behave" insert -- behave independently of each other in the individual narrow service areas --
Line 33, delete "can not" insert -- cannot --.
Line 37, before "subscribers" insert -- number of --
Line 39, "stations is to" insert -- station must --
Line 39, delete "in the narrow area" insert -- in each new narrow area --
Line 50, delete "the favorable location of the new base station" insert -- finding a favorable location for the new base station --
Line 56, after "without" insert -- the --

Column 4,
Line 34, after "information" insert -- representative of the service sub-area 3 --

Signed and Sealed this

Eighteenth Day of May, 2004

JON W. DUDAS
*Acting Director of the United States Patent and Trademark Office*